United States Patent
Takahashi et al.

(10) Patent No.: US 12,489,877 B2
(45) Date of Patent: Dec. 2, 2025

(54) CONTROL APPARATUS, IMAGE PICKUP APPARATUS, AND LENS APPARATUS

(71) Applicant: CANON KABUSHIKI KAISHA, Tokyo (JP)

(72) Inventors: Gaku Takahashi, Tochigi (JP); Tomonori Ishikawa, Tochigi (JP); Kohei Karasawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 18/636,488

(22) Filed: Apr. 16, 2024

(65) Prior Publication Data

US 2024/0388686 A1    Nov. 21, 2024

(30) Foreign Application Priority Data

May 17, 2023    (JP) ................................. 2023-081749

(51) Int. Cl.
*H04N 13/296*    (2018.01)
*G03B 13/36*    (2021.01)
(Continued)

(52) U.S. Cl.
CPC ........... *H04N 13/296* (2018.05); *G03B 13/36* (2013.01); *G03B 35/12* (2013.01); *H04N 13/207* (2018.05);
(Continued)

(58) Field of Classification Search
CPC .. H04N 13/296; H04N 13/207; H04N 13/366; H04N 13/398; H04N 13/239;
(Continued)

(56) References Cited

U.S. PATENT DOCUMENTS 6,507,359 B1 *    1/2003  Muramoto ........... H04N 13/189
                                                              348/42
9,880,672 B2 *    1/2018  Ugawa .................. H04N 13/31
(Continued)

FOREIGN PATENT DOCUMENTS

JP        5670786 B2    2/2015
JP      2021051282 A    4/2021
WO     2011118078 A1    9/2011

*Primary Examiner* — Tung T Vo
(74) *Attorney, Agent, or Firm* — ROSSI, KIMMS & McDOWELL LLP

(57) ABSTRACT

A control apparatus for an image display system that includes a first optical system configured to form a first optical image of an object, a second optical system configured to form a second optical image of the object, a first driving unit configured to move a first imaging position of the first optical image and a second imaging position of the second optical image, a second driving unit configured to move the second imaging position, and an operation unit operable to adjust the second driving unit includes a memory storing instructions, and a processor configured to execute the instructions to acquire information regarding the first imaging position and the second imaging position, and cause a display unit to display the information in a case where the second driving unit moves the second imaging position in accordance with an operation on the operation unit.

9 Claims, 5 Drawing Sheets

(51) Int. Cl.
  *G03B 35/12* (2021.01)
  *H04N 13/207* (2018.01)
  *H04N 13/366* (2018.01)
  *H04N 13/398* (2018.01)

(52) U.S. Cl.
  CPC ......... *H04N 13/366* (2018.05); *H04N 13/398* (2018.05)

(58) Field of Classification Search
  CPC .. H04N 13/246; H04N 13/327; H04N 13/344; G03B 13/36; G03B 35/12
  USPC .......................................................... 348/47
  See application file for complete search history.

(56) References Cited

U.S. PATENT DOCUMENTS

| | | | | |
|---|---|---|---|---|
| 10,616,568 B1* | 4/2020 | Lin | ...................... | H04N 13/383 |
| D924,761 S * | 7/2021 | Hamlin | ........................ | D12/187 |
| 11,949,977 B2* | 4/2024 | Okuwaki | ............... | H04N 23/62 |
| 12,301,777 B2* | 5/2025 | Kimata | ................... | H04N 23/55 |
| 2008/0219654 A1* | 9/2008 | Border | ................. | H04N 23/673 |
| | | | | 396/89 |
| 2010/0134651 A1* | 6/2010 | Morimoto | ............ | H04N 23/951 |
| | | | | 348/229.1 |
| 2011/0007133 A1* | 1/2011 | Imanishi | .............. | H04N 13/194 |
| | | | | 348/42 |
| 2011/0018970 A1* | 1/2011 | Wakabayashi | ....... | H04N 23/673 |
| | | | | 348/47 |
| 2011/0025824 A1* | 2/2011 | Kato | ...................... | G03B 35/00 |
| | | | | 396/326 |
| 2011/0050944 A1* | 3/2011 | Nakamura | ........... | H04N 9/8211 |
| | | | | 348/222.1 |
| 2011/0069151 A1* | 3/2011 | Orimoto | ................ | G03B 35/00 |
| | | | | 396/326 |
| 2011/0279655 A1* | 11/2011 | Tan | ...................... | H04N 13/218 |
| | | | | 348/E13.074 |
| 2011/0316975 A1* | 12/2011 | Tan | ...................... | G03B 17/565 |
| | | | | 348/46 |
| 2012/0050578 A1* | 3/2012 | Aoki | .................... | H04N 23/667 |
| | | | | 396/529 |
| 2012/0051732 A1* | 3/2012 | Aoki | ...................... | G03B 35/10 |
| | | | | 396/374 |
| 2012/0154547 A1* | 6/2012 | Aizawa | .................. | G03B 13/36 |
| | | | | 348/47 |
| 2013/0002830 A1 | 1/2013 | Pan | | |
| 2013/0070061 A1* | 3/2013 | Pan | ........................ | G03B 19/07 |
| | | | | 348/49 |
| 2013/0088580 A1* | 4/2013 | Ikeda | ..................... | G03B 35/10 |
| | | | | 348/241 |
| 2013/0128003 A1* | 5/2013 | Kishida | .................. | G03B 17/18 |
| | | | | 348/47 |
| 2013/0162784 A1* | 6/2013 | Ueda | ..................... | H04N 13/296 |
| | | | | 348/E5.045 |
| 2014/0168383 A1* | 6/2014 | Murakami | ........... | H04N 13/296 |
| | | | | 348/47 |
| 2014/0210957 A1* | 7/2014 | Kodama | ............... | H04N 13/207 |
| | | | | 348/50 |
| 2016/0065833 A1* | 3/2016 | Chen | ..................... | H04N 23/45 |
| | | | | 348/262 |
| 2016/0065941 A1* | 3/2016 | Oniki | ..................... | H04N 13/239 |
| | | | | 348/47 |
| 2017/0011525 A1* | 1/2017 | Kim | ...................... | G06V 20/52 |
| 2017/0223275 A1* | 8/2017 | Yanagisawa | .......... | H04N 25/704 |
| 2018/0042465 A1* | 2/2018 | Hino | ................... | G02B 23/2415 |
| 2019/0068889 A1* | 2/2019 | Lee | ...................... | H04N 23/632 |
| 2020/0183121 A1* | 6/2020 | Takamiya | ............. | G03B 15/006 |
| 2021/0034150 A1* | 2/2021 | Hagiwara | .............. | G06V 40/18 |
| 2022/0385828 A1* | 12/2022 | Okuwaki | ............. | H04N 23/635 |
| 2022/0385877 A1* | 12/2022 | Kimata | ................. | H04N 23/635 |
| 2022/0400208 A1* | 12/2022 | Takao | ................... | H04N 23/635 |
| 2023/0209177 A1* | 6/2023 | Inazawa | ............... | H04N 23/667 |
| | | | | 348/333.02 |
| 2023/0300453 A1* | 9/2023 | Seki | ...................... | H04N 23/611 |
| | | | | 348/49 |
| 2024/0114241 A1* | 4/2024 | Fukai | ..................... | H04N 23/55 |
| 2024/0214541 A1* | 6/2024 | Inoue | ................... | H04N 13/296 |
| 2025/0133288 A1* | 4/2025 | Kosaka | .................. | H04N 23/651 |

\* cited by examiner

CONTROL APPARATUS, IMAGE PICKUP APPARATUS, AND LENS APPARATUS

BACKGROUND

Technical Field

One of the aspects of the embodiments relates to a control apparatus, an image pickup apparatus, and a lens apparatus.

Description of Related Art

In order for a viewer to obtain the natural three-dimensional sense using a stereoscopic image display apparatus such as VR goggles or a three-dimensional display, a pair of left-eye and right-eye images are to be focused on the same object. International Publication No. WO 2011/118078 discloses a configuration that independently moves left and right optical systems using two actuators for autofocus (AF) respectively. Japanese Patent Laid-Open No. 2021-51282 discloses a configuration that integrally moves left and right optical systems using a single actuator. Japanese Patent No. 5670786 discloses a configuration that performs AF using one of two lens apparatuses and enables a user to determine an input value to offset a lens position and adjust a focus difference between left and right (LR focus difference hereinafter) while viewing images.

The configuration disclosed in International Publication No. WO 2011/118078 drives two actuators during AF and thus needs high power consumption and a complicated driving circuit. The configuration disclosed in Japanese Patent Laid-Open No. 2021-51282 adjusts the LR focus difference using a spacer during assembly, but tilting of the camera sensor also causes the LR focus difference not only during assembly but also during attachment of the camera sensor. In the configuration disclosed in Japanese Patent No. 5670786, it is up to the user to determine whether the LR focus difference is within a desired range, and whether or not the LR focus difference causes a sense of discomfort is unknown until a stereoscopic image is generated.

SUMMARY

A control apparatus according to one aspect of the disclosure for an image display system that includes a first optical system configured to form a first optical image of an object, a second optical system configured to form a second optical image of the object, a first driving unit configured to move a first imaging position of the first optical image and a second imaging position of the second optical image, a second driving unit configured to move the second imaging position, and an operation unit operable to adjust the second driving unit includes a memory storing instructions, and a processor configured to execute the instructions to acquire information regarding the first imaging position and the second imaging position, and cause a display unit to display the information in a case where the second driving unit moves the second imaging position in accordance with an operation on the operation unit. An image pickup apparatus and a lens apparatus each having the above control apparatus also constitutes another aspect of the disclosure.

Further features of various embodiments of the disclosure will become apparent from the following description of embodiments with reference to the attached drawings.

DESCRIPTION OF THE EMBODIMENTS

Figure 1:
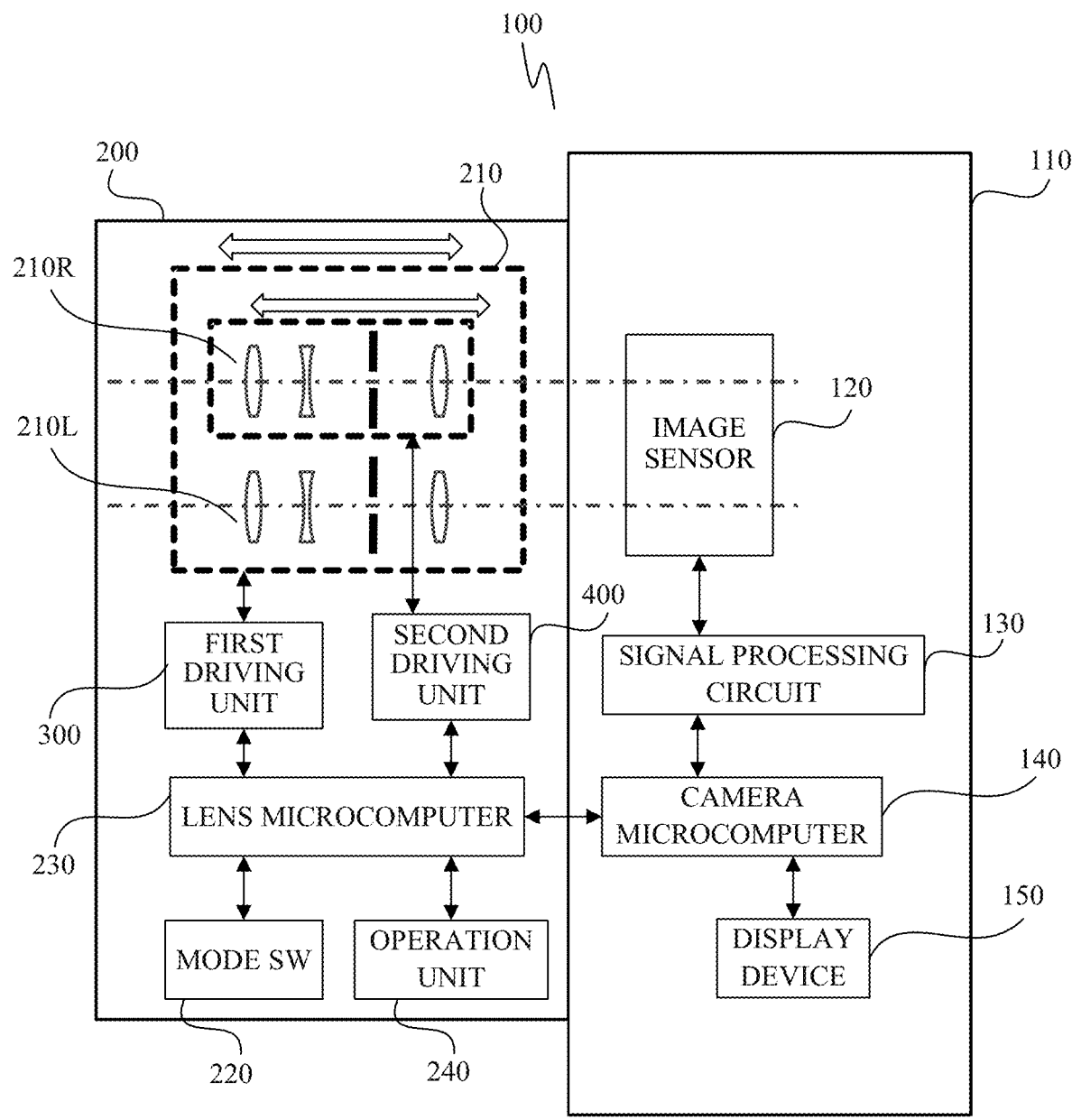
FIG. 1 is a block diagram illustrating a basic configuration of a stereoscopic image display apparatus according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a block diagram illustrating a basic configuration of a stereoscopic image display apparatus (image display system) 100 according to this embodiment. The stereoscopic image display apparatus 100 includes a camera body (image pickup apparatus) 110 and an interchangeable lens 200. The interchangeable lens 200 is attachable to and detachable from the camera body 110.

A description will now be given of the configuration of the interchangeable lens 200. The interchangeable lens 200 includes an optical system 210, a mode switch (SW) 220, a lens microcomputer 230, an operation unit 240, a first driving unit 300, and a second driving unit 400.

The optical system 210 includes a right-eye optical system 210R and a left-eye optical system 210L. One of the right-eye optical system 210R and the left-eye optical system 210L is defines as a first optical system, and the other is defined as a second optical system. This embodiment sets the left-eye optical system 210L to the first optical system, and the right-eye optical system 210R to the second optical system. The right-eye optical system 210R and the left-eye optical system 210L are arranged along a horizontal (lateral) direction and form optical images of the same object.

The first driving unit 300 simultaneously adjusts (moves) a right-eye focus position (second imaging position) for a right-eye optical image (second optical image) formed by the right-eye optical system 210R and a left-eye focus position (first imaging position) for a left-eye optical image (first optical image) formed by the left-eye optical system 210L. The first driving unit 300 adjusts the right-eye focus position by moving at least one lens included in the right-eye optical system 210R along the optical axis direction. The first driving unit 300 adjusts the left and right-eye focus positions by moving at least one lens included in the left-eye optical system 210L along the optical axis direction. In the following description, a right-eye focus position and a left-eye focus position will be collectively referred to as a focus position.

The second driving unit 400 adjusts (moves) only the right-eye focus position. The second driving unit 400 adjusts the right-eye focus position by moving at least one lens included in the right-eye optical system 210R along the optical axis direction.

In this embodiment, as described above, the left-eye optical system 210L is the first optical system, the right-eye optical system 210R is the second optical system, and the second driving unit 400 controls the right-eye focus position. However, this embodiment is not limited to this example. In a case where the right-eye optical system 210R is the first optical system and the left-eye optical system 210L is the second optical system, the second driving unit 400 adjusts the left-eye focus position. That is, the second driving unit 400 may be configured to adjust one of the right-eye focus position and the left-eye focus position.

The operation unit 240 is used by the user to adjust the focus position. In a case where the user operates the operation unit 240, the lens microcomputer 230 determines driving amounts and driving directions of the first driving unit 300 and the second driving unit 400 based on the operation amount and operation direction of the operation unit 240. In this embodiment, the operation unit 240 is a so-called focus ring that is provided on the barrel exterior of the interchangeable lens 200 rotatably around an axis parallel to the optical axis, but this embodiment is not limited to this example.

The mode SW 220 is a switch for switching the stereoscopic image display apparatus 100 between an imaging mode and an LR focus difference adjustment mode. In the imaging mode, the lens microcomputer 230 sends a command only to the first driving unit 300, and performs focusing by extending the entire optical system. On the other hand, in the LR focus difference adjustment mode, the lens microcomputer 230 sends a command only to the second driving unit 400, moves only the right-eye optical system 210R, and adjusts the LR focus difference.

A description will now be given of the configuration of the camera body 110. The camera body 110 includes an image sensor 120, a signal processing circuit 130, a camera microcomputer (control apparatus) 140, and a display device (display unit) 150.

The image sensor 120 photoelectrically converts (captures) a right-eye optical image formed by the right-eye optical system 210R and a left-eye optical image formed by the left-eye optical system 210L, and outputs an analog imaging signal as an electrical signal. The analog imaging signal is converted into a digital imaging signal by an unillustrated A/D converter circuit.

The signal processing circuit 130 generates a video signal (captured image) by performing various image processing for the digital imaging signal and outputs it to the camera microcomputer 140. Pixel signals output from phase difference focus detecting pixels provided to the image sensor 120 are similarly output to the camera microcomputer 140.

The camera microcomputer 140 centrally controls the entire stereoscopic image display apparatus 100. The camera microcomputer 140 also adjusts the focus position. More specifically, the camera microcomputer 140 detects a focus shift amount (defocus amount) by the phase difference detecting method based on the pixel signal acquired from the phase difference focus detecting pixels, and calculates a driving amount of the first driving unit 300 or the second driving unit 400 according to the defocus amount. The camera microcomputer 140 functions as an acquiring configured to acquire the right-eye focus position and the left-eye focus position. In adjusting the right-eye focus position, the camera microcomputer 140 functions as a display control unit configured to cause the display device 150 to display information regarding the right-eye focus position and the left-eye focus position. The lens microcomputer 230 may have the functions of the acquiring unit and the display control unit. The camera microcomputer 140 and the lens microcomputer 230 may have a function of a memory configured to store the right-eye focus position and the left-eye focus position.

The display device 150 is, for example, a rear LCD of the camera body 110 or an electronic viewfinder, and displays a video signal as a live-view image, and various information regarding changing imaging parameters and adjusting the focus position.

Figure 2:
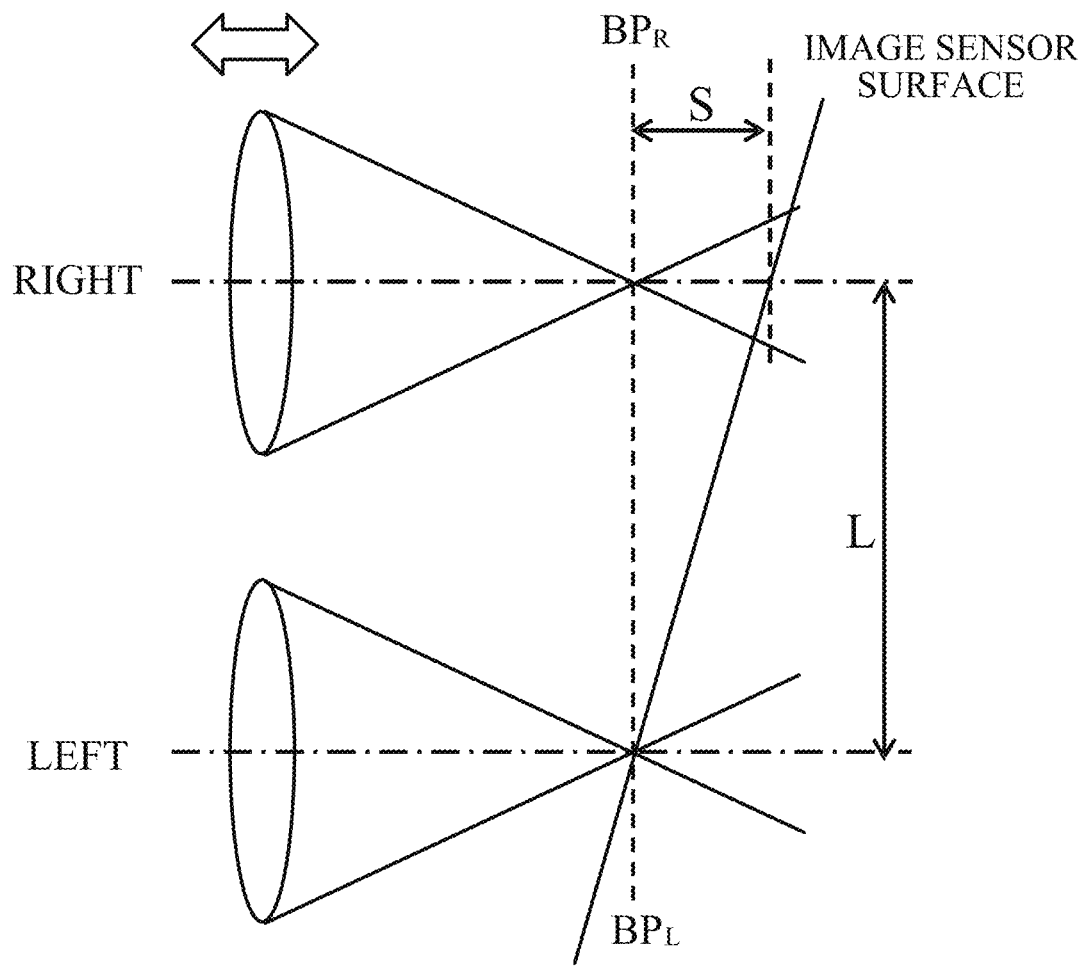
FIG. 2 explains LR focus difference adjustment.
Figure 3:
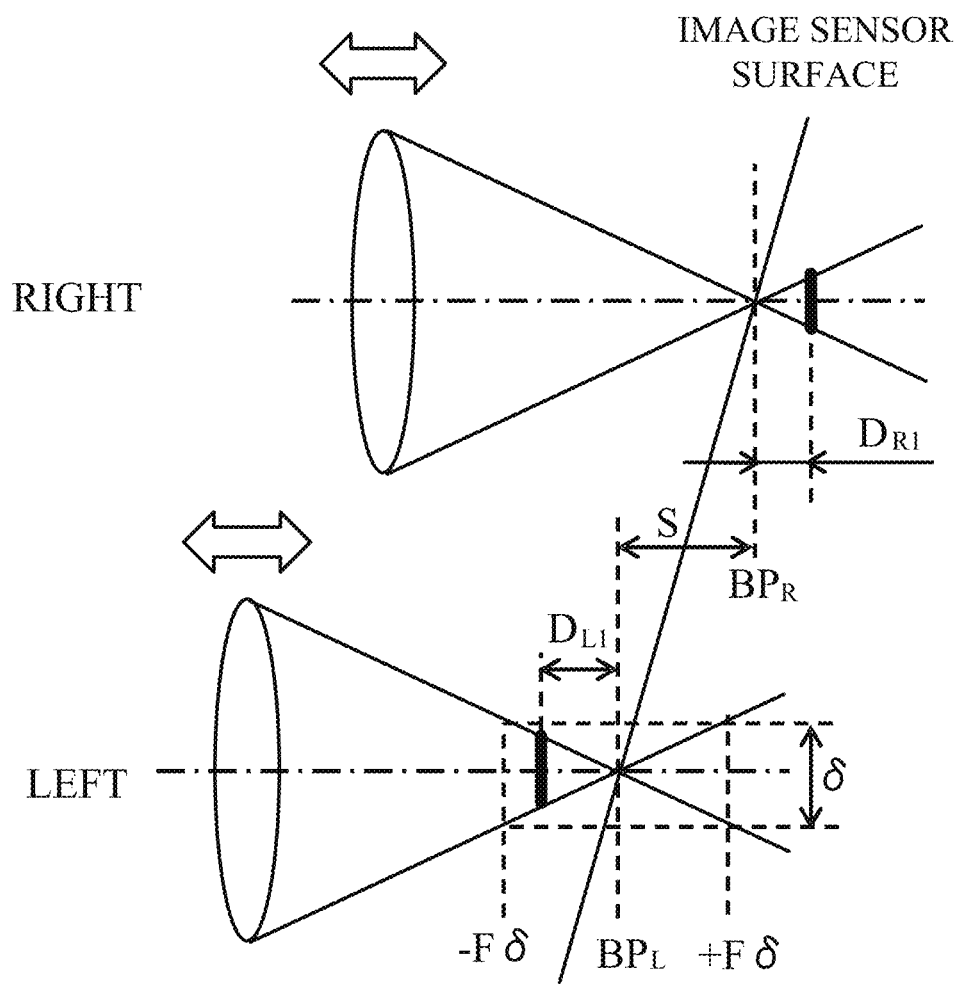
FIG. 3 explains the LR focus difference adjustment.
Figure 4:
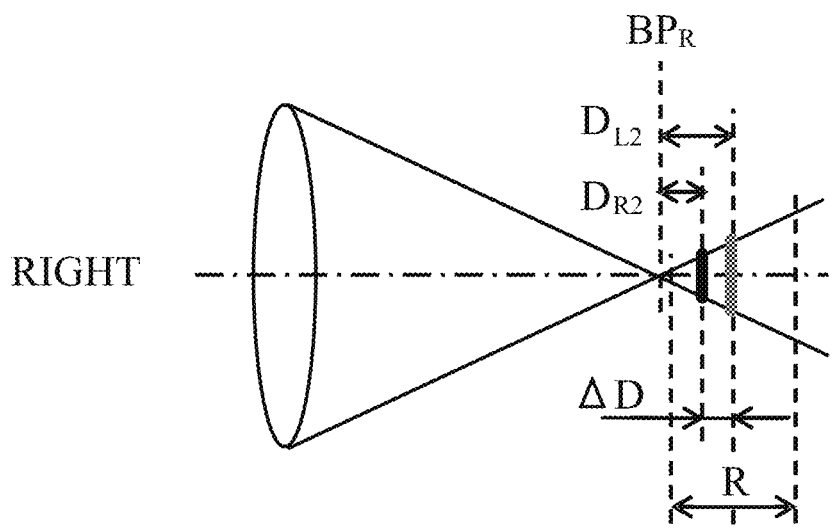
FIG. 4 explains the LR focus difference adjustment.

Referring now to FIGS. 2 to 4, a description will be given of adjustment of a focus difference between left and right (LR focus difference adjustment). FIGS. 2 to 4 explain the LR focus difference adjustment.

A description will now be given of a reason for the LR focus difference adjustment. The interchangeable lens 200 is attached to the camera body 110 via a camera mount unit provided to the camera body 110 and a lens mount unit provided to the interchangeable lens 200. Ideally, the image sensor 120 is installed so that the image sensor surface is parallel to the lens mount units, but in reality, it is difficult to install the image sensor 120 so that the image sensor surface is parallel to the lens mount units, due to manufacturing errors. That is, as illustrated in FIG. 2, the image sensor 120 is fixed with a slight slope (S/L) of the image sensor surface relative to the lens mount units. In the interchangeable lens 200, the manufacturing process adjusts distances of a right-eye focus position $BP_R$ and a left-eye focus position $BP_L$ from the respective lens mount units, so-called flange back distances so that a difference between them approaches zero. However, due to the tilting of the image sensor 120, the distances of the right-eye focus position BPR and the left-eye focus position BPL from the image sensor surface become different. In other words, the LR focus difference occurs. In a case where this LR focus difference falls outside a permissible range, the user feels uncomfortable between left and right images, and it will be difficult for the user to obtain the three-dimensional sense from the left and right images. In this embodiment, as described above, the second driving unit 400 moves at least one lens included in the right-eye optical system 210R along the optical axis direction, thereby adjusting the LR focus difference.

A description will now be given of a schematic procedure of the LR focus difference adjustment. First, the left-eye focus position, which is a reference for the LR focus difference adjustment, is adjusted by AF using the first driving unit 300. Next, the user shifts the stereoscopic image display apparatus 100 to the LR focus difference adjustment mode using the mode SW 220. Finally, the user adjusts the LR focus difference by driving the second driving unit 400 using the operation unit 240 while viewing the display device 150.

Generally, AF uses an AF accuracy range defined by a permissible circle of confusion diameter δ, which is considered to be in focus, and an F-number (aperture value) F. FIG. 3 illustrates a state in which a focus difference corresponding to a left-eye focus position is $D_{L1}$ due to AF. In the state illustrated in FIG. 3, the user determines that the adjustment is completed when the user feels an in-focus state after viewing a right-eye image on the display device 150. In a case where a focus difference corresponding to the right-eye focus position at this time is $D_{R1}$, the LR focus difference is the sum of the focus differences $D_{L1}$ and $D_{R1}$. In other words, in a case where the left-eye and right-eye focus positions are adjusted for their respective best focus positions, due to variations in AF accuracy and manual adjustment, the LR focus difference may fall outside the permissible range that provides the natural three-dimensional sense.

Accordingly, in this embodiment, in adjusting the right-eye focus position, the camera microcomputer 140 causes the display device to display information regarding the right-eye focus position and the left-eye focus position. More specifically, as illustrated in FIG. 4, in adjusting the right-eye focus position, the camera microcomputer 140 displays an LR focus difference permissible range R in the left-eye focus position and the left-eye focus position are distributed from the center. Thereby, the user can know an LR focus difference ΔD between the focus difference $D_{R2}$ corresponding to the right-eye focus position and the focus difference $D_{L2}$ corresponding to the left-eye focus position, and adjust the right-eye focus position so that the LR focus difference ΔD falls within the LR focus difference permissible range R.

Figure 5:
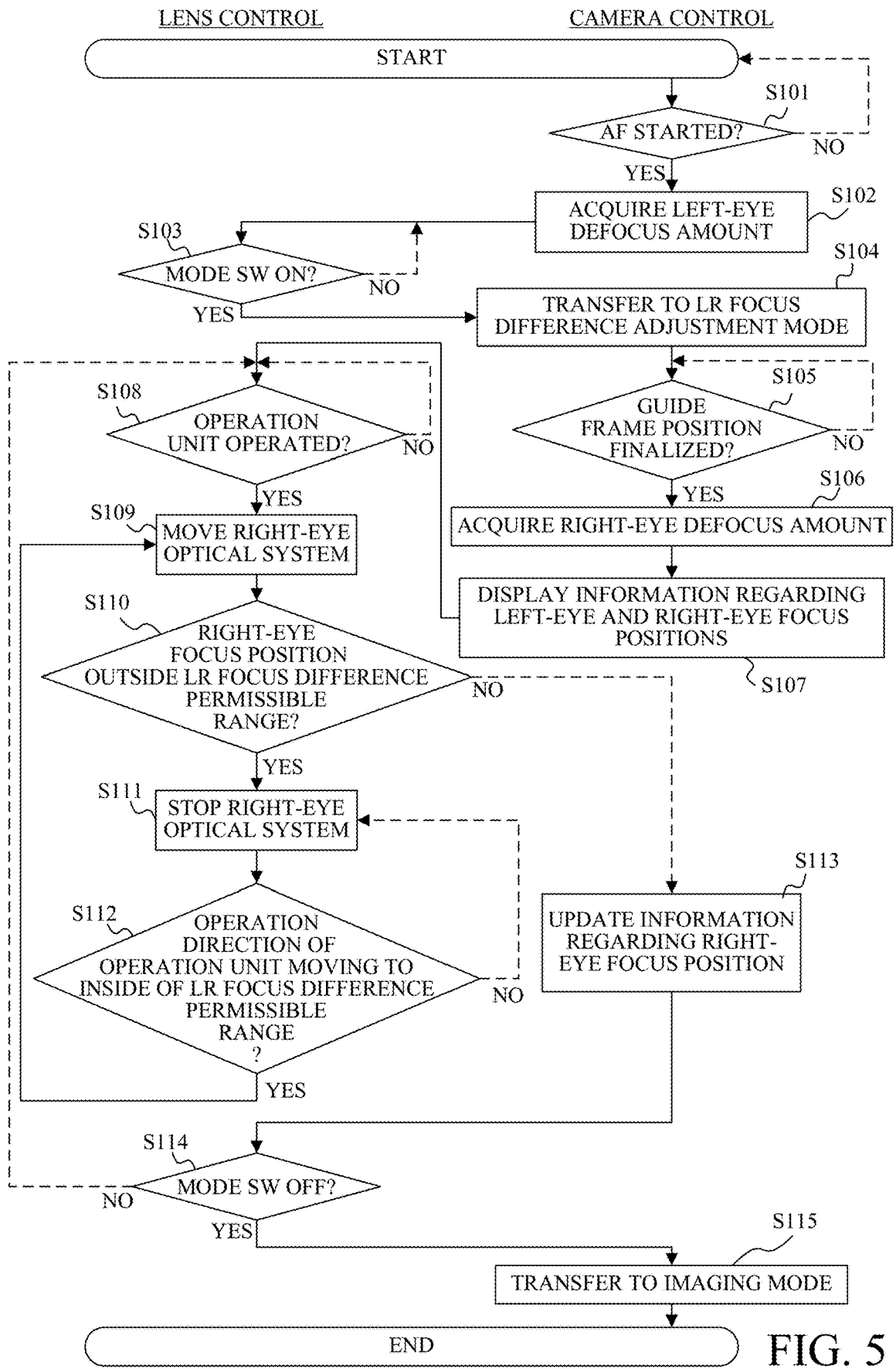
FIG. 5 is a flowchart illustrating LR focus difference adjustment processing.

FIG. 5 is a flowchart illustrating LR focus difference adjustment processing. Among the processes relating to the flowchart in FIG. 5, lens control is performed by the lens microcomputer 230, and camera control is performed by the camera microcomputer 140.

In step S101, the camera microcomputer 140 determines whether the user starts AF to adjust the left-eye focus position, which is the reference for the LR focus difference adjustment, and to suppress a focus difference between left and right images. For example, the camera microcomputer 140 determines that the user has started AF in a case where a shutter button (not illustrated) of the camera body 110 is half-pressed. In a case where the camera microcomputer 140 determines that the user has started AF, the flow proceeds to step S102, and in a case where the camera microcomputer 140 determines that the user has not started AF, the flow returns to step S101 (to stand by until AF starts).

In step S102, the camera microcomputer 140 executes AF processing and acquires a left-eye defocus amount.

In step S103, the lens microcomputer 230 determines whether the user has turned on the mode SW 220. In a case where the lens microcomputer 230 determines that the mode SW 220 has been turned on by the user, it transmits the fact that the mode SW 220 is turned on to the camera microcomputer 140, and the flow proceeds to step S104. In a case where the lens microcomputer 230 determines that the user has not turned on the mode SW 220, the flow returns to step S103 (to stand by until the mode SW 220 is turned on).

In step S104, the camera microcomputer 140 transfers the stereoscopic image display apparatus 100 to the LR focus difference adjustment mode.

In step S105, the camera microcomputer 140 enables the user to move a guide frame for manual focusing for the autofocused object while viewing the right-eye image in order to adjust the right-eye focus position, and determines whether the user has finalized the position of the guide frame. In a case where the camera microcomputer 140 determines that the user has finalized the position of the guide frame, the flow proceeds to step S106, and in a case where it determines that the user has finalized the position of the guide frame, the flow returns to step S106 (to stand by until the position of the guide frame is finalized).

In step S106, the camera microcomputer 140 acquires the right-eye defocus amount at the position of the guide frame specified in step 105. The camera microcomputer 140 determines a LR focus difference permissible range based on a preset LR focus difference permissible value and the above left-eye defocus amount. For example, the left-eye focus position may be equally distributed in the plus and minus directions so that the left-eye focus position is located at the center of the LR focus difference permissible range.

In step S107, the camera microcomputer 140 causes the display device 150 to display information regarding the left-eye focus position and the right-eye focus position. In this embodiment, the display device 150 displays the LR focus difference permissible range, a marker corresponding to the left-eye focus position, and a marker corresponding to the current right-eye focus position in the guide frame. The user operates the operation unit 240 using the content displayed on the display device 150 and adjusts the LR focus difference. The content displayed on the display device 150 is not limited to the content of this embodiment as long as the content enables the user to facilitate the LR focus difference adjustment.

Figure 6:
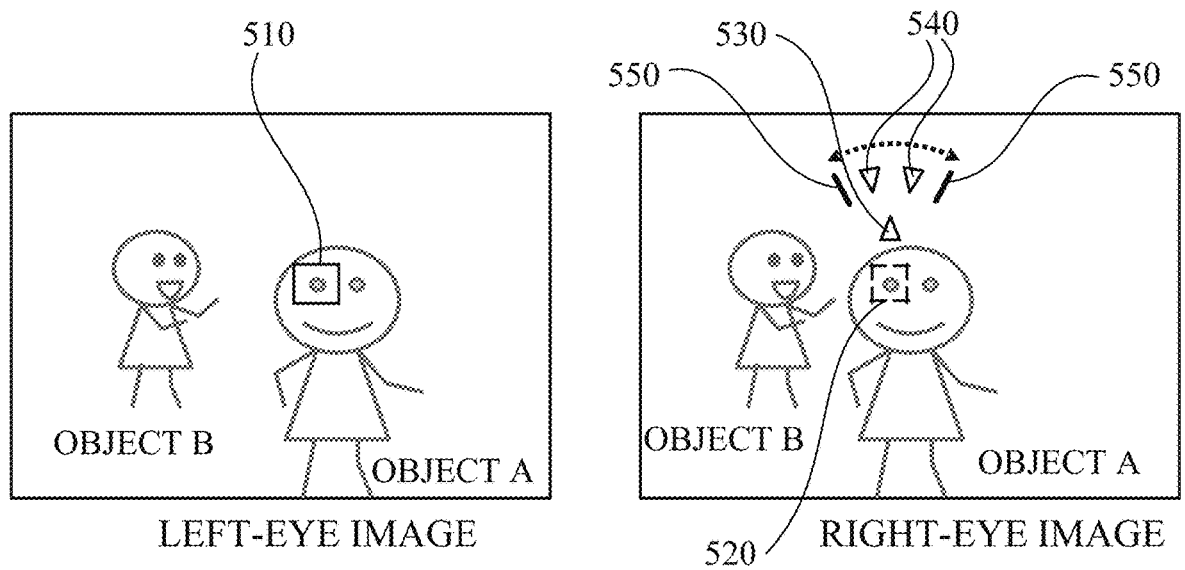
FIG. 6 illustrates a display example of a display device according to the first embodiment.

FIG. 6 illustrates a display example of the display device 150 in step S107. A left-eye image based on a left-eye optical image formed by the left-eye optical system 210L and a right-eye image based on a right-eye optical image formed by the right-eye optical system 210R are displayed side by side on the display device 150. The left-eye image is an image obtained by aligning an AF frame 510 with an eye of object A and performing AF in step S101. The right-eye image is an image in which the user has moved a guide frame 520 to the eye of the object A, which is located at the position where AF was performed, and finalized the position of the guide frame 520 in step S105. The right-eye image includes a marker 530 corresponding to the left-eye focus position, markers 540 corresponding to the current right-eye focus position in the guide frame 520, and a LR focus difference permissible range 550.

The two markers 540 are separated at left and right positions, and a distance between the two markers 540 represents the LR focus difference. In this embodiment, as the user operates the operation unit 240 so as to reduce the LR focus difference, the distance between the two markers 540 reduces (the two markers 540 come closer together). On the other hand, as the user operates the operation unit 240 to increase the LR focus difference, the distance between the two markers 540 increases (the two markers 540 move farther apart). In a case where the two markers 540 overlap each other, the two overlapping markers 540 and the marker 530 are aligned on the same straight line. In this state, the LR focus difference is zero.

The LR focus difference permissible range 550 is a range determined from the preset LR focus difference permissible value based on the marker 530, and is determined according to the resolution of the optical system 210 and the resolution of the display device 150. In this embodiment, the LR focus difference permissible range 550 is expressed by a separation amount between the left and right markers 540. Thus, the user can easily adjust the LR focus difference in the LR focus difference adjustment by displaying the marker 530 corresponding to the left-eye focus position as the adjustment reference, and the LR focus difference permissible range 550 on the display device 150.

In the LR focus difference adjustment, images to be displayed on the display device 150 may be left and right images displayed side by side or displayed while one of them is enlarged and switchable to the other in order to facilitate the LR focus difference adjustment.

In step S108, the lens microcomputer 230 determines whether the user has operated the operation unit 240, by detecting an operation amount and operation direction of the operation unit 240. In a case where the lens microcomputer 230 determines that the user has operated the operation unit 240, the flow proceeds to step S109, and in a case where it determines that the user has not operated the operation unit 240, the flow returns to step S108 (to stand by until the user operates the operation unit 240).

In step S109, the lens microcomputer 230 sends the driving direction and driving amount according to the operation amount and operation direction of the operation unit 240 to the second driving unit 400, and moves the right-eye optical system 210R.

In step S110, the lens microcomputer 230 determines whether the right-eye focus position is outside (beyond) the LR focus difference permissible range. In a case where the lens microcomputer 230 determines that the right-eye focus position is outside the LR focus difference permissible range, the flow proceeds to step S111. On the other hand, in a case where the lens microcomputer 230 determines that the right-eye focus position is not outside the LR focus difference permissible range (it is within the LR focus difference permissible range), the flow proceeds to step S113.

In step S111, the lens microcomputer 230 stops the right-eye optical system 210R regardless of the operation on the operation unit 240. In other words, the user is unable to move the right-eye focus position.

The camera microcomputer 140 may have a function of a notifying unit configured to notify the user that the right-eye focus position is outside the LR focus difference permissible range. The notification method may cause the display device 150 to display information (letters, marks, etc.) indicating that the right-eye focus position is outside the LR focus difference permissible range, vibrate a part of the stereoscopic image display apparatus 100, or emit a notification sound. The lens microcomputer 230 may have a function of the notifying unit.

In step S112, the lens microcomputer 230 detects the operation direction of the operation unit 240, and determines whether the operation direction is a direction that moves the right-eye focus position to the inside of the LR focus difference permissible range. In a case where the lens microcomputer 230 determines that the operation direction is the direction that moves the right-eye focus position to the inside of the LR focus difference permissible range, the flow proceeds to step S109. In a case where the lens microcomputer 230 determines that the operation direction is not the direction that moves the right-eye focus position to the inside of the LR focus difference permissible range, the flow proceeds to step S111 (maintains the right-eye optical system 210R stopped).

In step S113, the camera microcomputer 140 updates the information regarding the right-eye focus position displayed on the display device 150. In this embodiment, the camera microcomputer 140 changes the marker corresponding to the current right-eye focus position on the guide frame.

In step S114, the lens microcomputer 230 determines whether the user has turned off the mode SW 220. In a case where the lens microcomputer 230 determines that the mode SW 220 has been turned off by the user, it transmits to the camera microcomputer 140 that the mode SW 220 is turned off, and the flow proceeds to step S115. In a case where the lens microcomputer 230 determines that the user has not turned off the mode SW 220, the flow returns to step S108.

In step S115, the camera microcomputer 140 transfers the stereoscopic image display apparatus 100 to an imaging mode.

In the flow of FIG. 5, the camera microcomputer 140 may perform part of the determination processing performed by the lens microcomputer 230.

As described above, even when the lens apparatus is interchanged in the lens interchangeable type stereoscopic image pickup apparatus, the configuration according to this embodiment enables the user to easily adjust the LR focus difference using a simple configuration so as to maintain AF performance and capture stereoscopic images that do not provide the discomfort sense.

Second Embodiment

The first embodiment moves the markers along the circumferential direction, and narrows or widens a gap between the two markers to visualize the LR focus difference, but this example linearly visualize the LR focus difference (using a bar).

The stereoscopic image display apparatus according to this embodiment has a configuration similar to that of the stereoscopic image display apparatus 100 according to the first embodiment. This embodiment will discuss only a different configuration from the first embodiment, and omit a description of the common configuration.

Figure 7:
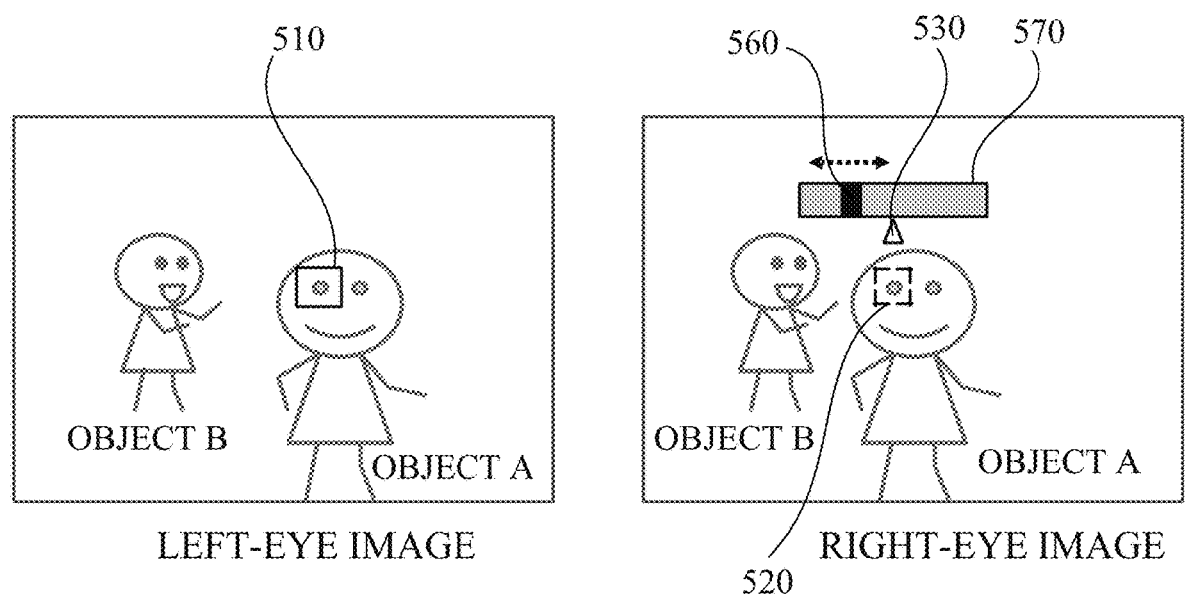
FIG. 7 illustrates a display example of a display device according to a second embodiment.

FIG. 7 illustrates a display example of the display device 150 in a case where the user adjusts the LR focus difference. A left-eye image based on a left-eye optical image formed by the left-eye optical system 210L and a right-eye image based on a right-eye optical image formed by the right-eye optical system 210R are displayed side by side on the display device 150. The left-eye image is an image obtained by aligning the AF frame 510 with the eye of the object A and performing AF in step S101. The right-eye image is an image in which the user has moved the guide frame 520 to the eye of the object A, which is located at the position where AF was performed, and finalized the position of the guide frame 520 in step S105. The right-eye image includes a marker 530 corresponding to the left-eye focus position, a bar 560 corresponding to the current right-eye focus position in the guide frame 520, and a LR focus difference permissible range 570. In this embodiment, the LR focus difference permissible range 570 is linearly displayed, and the bar 560 is configured to linearly move on the LR focus difference permissible range 570.

By visualizing the difference between the bar 560 and the marker 530, the user can intuitively recognize the LR focus difference. The LR focus difference permissible range 570 is a range determined from a preset LR focus difference permissible value based on the marker 530, and is determined according to the resolution of the optical system 210 and the resolution of the display device 150. In this embodiment, the LR focus difference permissible range 550 is expressed by the length in the horizontal direction.

Since this embodiment linearly displays the LR focus difference permissible range 570 based on the marker 530, the user can be notified of the LR focus difference with a plus or minus sign. More specifically, in a case where the bar 560 is on the left side of the marker 530, the sign may be set to a minus, and the user can recognize that the right-eye focus position is focused in front of the left-eye focus position (so-called front focus).

As described above, even when the lens apparatus is interchanged in the lens interchangeable type stereoscopic image pickup apparatus, the configuration according to this embodiment enables the user to easily adjust the LR focus difference using a simple configuration so as to maintain AF performance and capture stereoscopic images that do not provide the discomfort sense.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide a control apparatus that enables a user to easily adjust a focus difference between left and right using a simple configuration.

This application claims priority to Japanese Patent Application No. 2023-081749, which was filed on May 17, 2023, and which is hereby incorporated by reference herein in its entirety.

What is claimed is:

1. A control apparatus for an image display system that includes a first optical system configured to form a first optical image of an object, a second optical system configured to form a second optical image of the object, a first driving unit configured to move a first imaging position of the first optical image and a second imaging position of the second optical image, a second driving unit configured to move the second imaging position, and an operation unit operable to adjust the second driving unit, the control apparatus comprising:
   a memory storing instructions; and
   a processor configured to execute the instructions to:
   acquire information regarding the first imaging position and the second imaging position, and
   cause a display unit to display the information in a case where the second driving unit moves the second imaging position in accordance with an operation on the operation unit,
   wherein in a case where the second driving unit moves the second imaging position in accordance with the operation of the operation unit and thereby the second imaging position falls outside a permissible range, the processor is configured to notify that the second imaging position falls outside the permissible range.

2. The control apparatus according to claim 1, wherein the memory further stores the information.

3. The control apparatus according to claim 1, wherein the information includes information regarding the first imaging position that does not change in accordance with the operation on the operation unit.

4. The control apparatus according to claim 1, wherein the information includes information regarding the second imaging position that changes in accordance with the operation on the operation unit.

5. The control apparatus according to claim 1, wherein the information includes information regarding a permissible range of the second imaging position.

6. The control apparatus according to claim 1, wherein in the case where the second driving unit moves the second imaging position in accordance with the operation of the operation unit and thereby the second imaging position falls outside the permissible range, the processor is configured to stop the second driving unit.

7. A control apparatus for an image display system that includes a first optical system configured to form a first optical image of an object, a second optical system configured to form a second optical image of the object, a first driving unit configured to move a first imaging position of the first optical image and a second imaging position of the second optical image, a second driving unit configured to move the second imaging position, and an operation unit operable to adjust the second driving unit, the control apparatus comprising:
   a memory storing instructions; and
   a processor configured to execute the instructions to:
   acquire information regarding the first imaging position and the second imaging position, and
   cause a display unit to display the information in a case where the second driving unit moves the second imaging position in accordance with an operation on the operation unit,
   wherein in a case where the second driving unit moves the second imaging position in accordance with an operation of the operation unit and thereby the second imaging position falls outside a permissible range, and an operation direction of the operation unit is a direction that moves the second imaging position to inside of the permissible range, the processor is configured to move the second imaging position using the second driving unit.

8. An image pickup apparatus comprising:
a control apparatus for an image display system that includes a first optical system configured to form a first optical image of an object, a second optical system configured to form a second optical image of the object, a first driving unit configured to move a first imaging position of the first optical image and a second imaging position of the second optical image, a second driving unit configured to move the second imaging position, an operation unit operable to adjust the second driving unit; and
an image sensor configured to photoelectrically convert the first optical image and the second optical image; and
a display unit configured to display information regarding the first imaging position and the second imaging position,
wherein the control apparatus includes:
a memory storing instructions; and
a processor configured to execute the instructions to:
acquire the information, and
cause the display unit to display the information in a case where the second driving unit moves the second imaging position in accordance with an operation on the operation unit,
wherein in a case where the second driving unit moves the second imaging position in accordance with the operation of the operation unit and thereby the second imaging position falls outside a permissible range, the processor is configured to notify that the second imaging position falls outside the permissible range.

9. A lens apparatus comprising:
a control apparatus;
a first optical system configured to form a first optical image of an object;
a second optical system configured to form a second optical image of the object;
a first driving unit configured to move a first imaging position of the first optical image and a second imaging position of the second optical image;
a second driving unit configured to move the second imaging position; and
an operation unit operable to adjust the second driving unit,
wherein the control apparatus includes:
a memory storing instructions; and
a processor configured to execute the instructions to:
acquire information regarding the first imaging position and the second imaging position, and
cause a display unit to display the information in a case where the second driving unit moves the second imaging position in accordance with an operation on the operation unit,
wherein in a case where the second driving unit moves the second imaging position in accordance with the operation of the operation unit and thereby the second imaging position falls outside a permissible range, the processor is configured to notify that the second imaging position falls outside the permissible range.

* * * * *